Jan. 28, 1964

A. M. DYER 3,119,527

APPARATUS FOR DISPENSING MEASURED QUANTITIES OF LIQUIDS

Filed Aug. 8, 1960

INVENTOR.
ARTHUR M. DYER
BY Fulwider, Mattingly
& Huntley
ATTORNEY

Jan. 28, 1964  A. M. DYER  3,119,527
APPARATUS FOR DISPENSING MEASURED QUANTITIES OF LIQUIDS
Filed Aug. 8, 1960  2 Sheets-Sheet 2
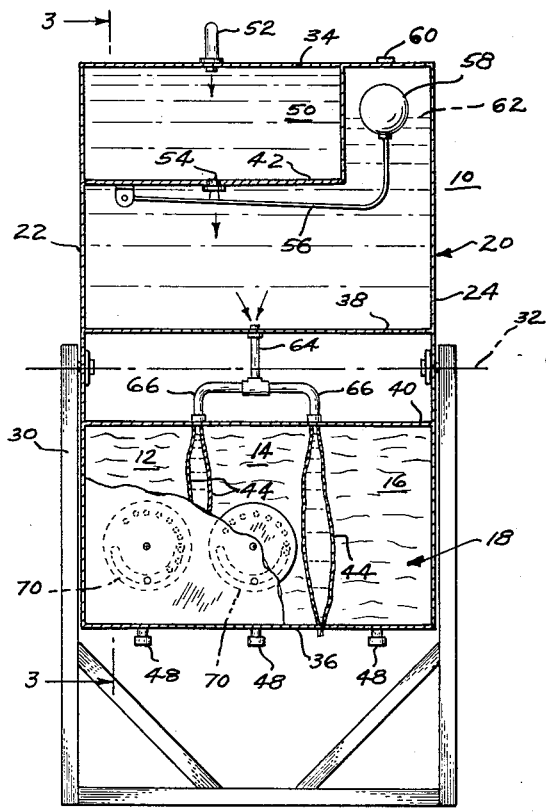
Fig.2
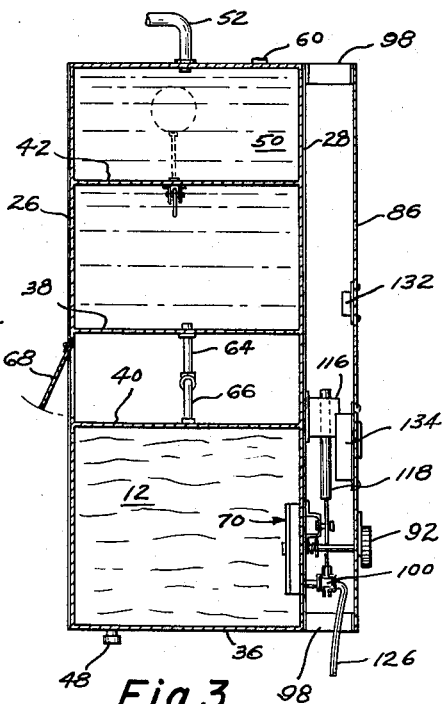
Fig.3
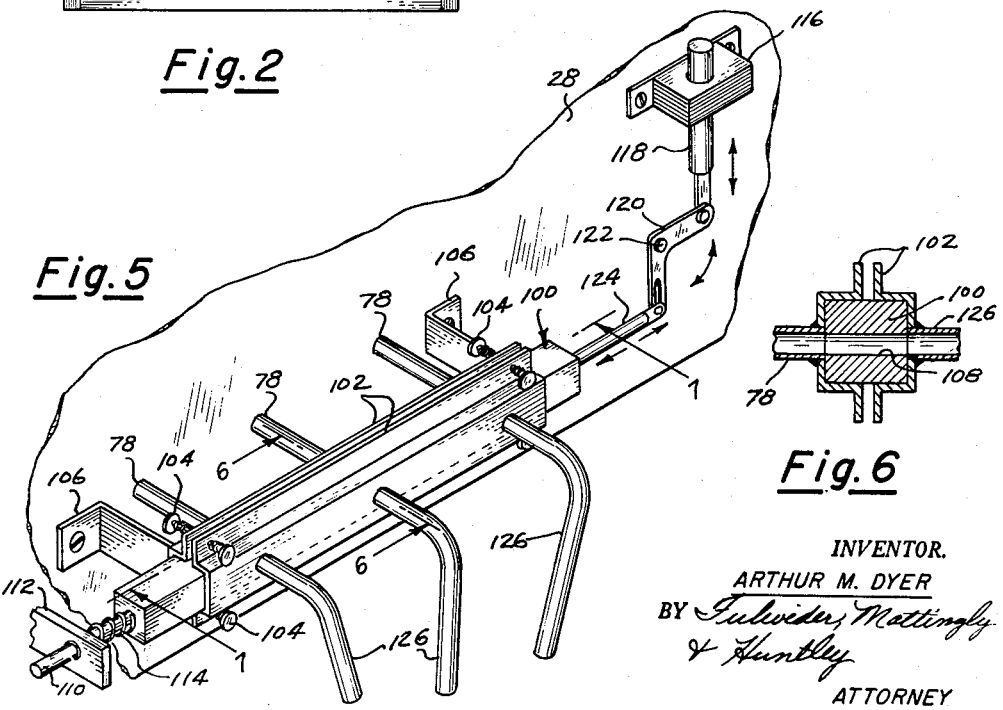
Fig.5
Fig.6
INVENTOR.
ARTHUR M. DYER
BY
ATTORNEY

United States Patent Office 3,119,527
Patented Jan. 28, 1964

3,119,527
APPARATUS FOR DISPENSING MEASURED
QUANTITIES OF LIQUIDS
Arthur M. Dyer, 523 N. Graves, El Cajon, Calif.
Filed Aug. 8, 1960, Ser. No. 48,124
5 Claims. (Cl. 222—70)

The present invention relates to apparatus for dispensing measured quantities of liquids, and more particularly to apparatus for dispenisng liquid quantities which bear a preselected and continuing proportional relationship to each other.

In dispensing liquids from a plurality of reservoirs it is difficult to adjust and correlate the rates of flow from the various reservoirs to produce liquid quantities from each reservoir which bear a continuing proportional relationship to each other. For example, if we assume that we have a pair of identical, filled reservoirs and wish to obtain liquid quantities of one gallon and ten gallons, respectively, from these reservoirs, it is possible to select sizes of outlets which will achieve this for a very limited period of time. However, the pressure head of the second reservoir will drop much more rapidly than the first, and it will be seen that the ratio of quantities dispensed will immediately vary. Thus, for each gallon dispensed from the first reservoir we will get something less than the desired ten gallons from the second reservoir because the pressure heads in the two reservoirs are no longer the same.

According to the present invention, an apparatus is provided which comprises walls or other means forming a reservoir for liquids. This reservoir is divided into a plurality of liquid storage reservoirs or compartments by a plurality of pairs of flexible walls, the walls of each pair forming pressure chambers which deform or are displaced by filling the liquid to thereby tend to establish substantially the same liquid height in the adjacent liquid storage compartments. Thus, the pressure imposed at the bottom of the various liquid storage compartments would be essentially the same, and location of the compartment outlets at the bottom of the compartments would accordingly be effective to dicharge liquids at proportional rates which do not change substantially even though one compartment is being emptied at a faster rate than its neighbor. The phenomenon is substantially similar where the liquids in adjacent compartments are of different densities.

The present invention also provides means for adjusting the rates of flow through the compartment outlets by providing means which define a plurality of orifices cumulatively interposable in the path of the liquids flowing from the various compartments. In addition, the invention comprehends the provision of a slidable valve for simultaneously opening or closing all of the outlets from the liquid storage compartments.

Such an apparatus has particular application to a device for measuring or metering out predetermined or preselected quantities of various colors of paints for the production of certain composite color shades. It will be apparent that the provision of a device or machine such as this affords an opportunity for paint stores to mix color shades immediately upon receipt of customer orders, thereby avoiding the stocking of a multiplicity of shades, and avoiding the delay of ordering the shade from a central warehouse. With the present apparatus it is merely necessary for the user to dial certain number combinations, which adjusts the quantity of paint discharged from the various compartments in a manner to be described. Then, since the machine is effective to maintain the same proportions of components regardless of the paint contained in each compartment, the opening of the slidable valve provides the necessary portions of each paint necessary to produce the shade desired.

Other objects and features of the present invention will be readily apparent to those skilled in the art from the following specification and appended drawings wherein is illustrated a preferred form of the invention, and in which:

FIGURE 2 is a front elevational view, in cross section, of the apparatus of FIGURE 1;

FIGURE 3 is a view taken along line 3—3 of FIGURE 2;

FIGURE 4 is an exploded perspective view illustrating the construction of a flow selector valve;

FIGURE 5 is a partial perspective view of the discharge slide valve and its associated solenoid actuator;

FIGURE 6 is a view taken along line 6—6 of FIGURE 5;

FIGURE 7 is a view taken along line 7—7 of FIGURE 5; and

FIGURE 8 is a diagrammatic view showing the electrical circuit and components for actuating the discharge slide valve.

Figure 1:
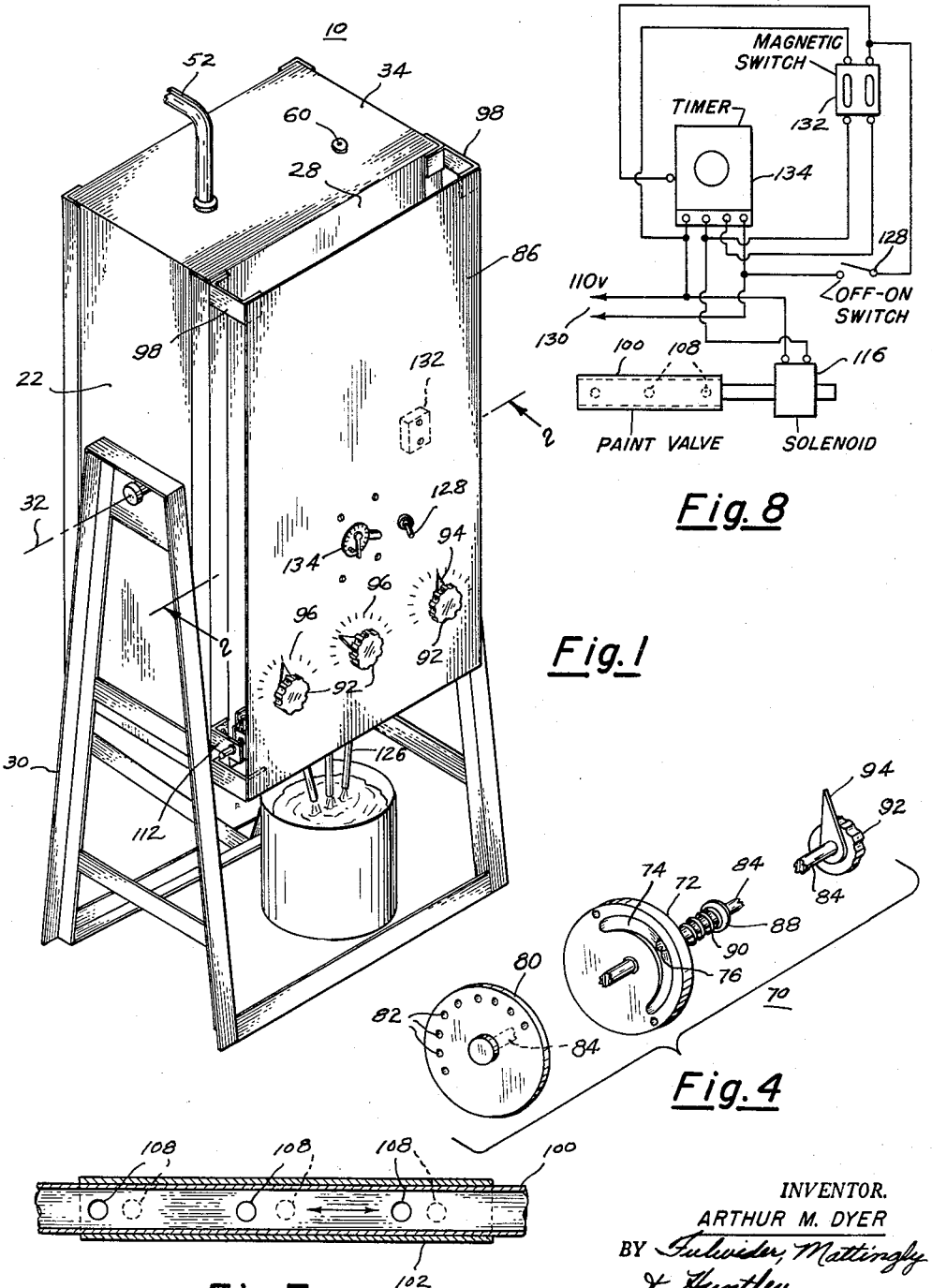
FIGURE 1 is a perspective view of the apparatus of the present invention.

Referring now to the drawings, there is illustrated an apparatus for dispensing measured quantities of liquids, and which will hereinafter be described in connection with the dispensing of measured quantities of various colors of paint. The apparatus, generally designated 10, is useful in a variety of applications, but for purposes of illustration, it will be described as a dispenser of paints. This application of apparatus 10 is very useful in local paint stores, for example, for mixing paints to produce color shades immediately after receiving customer orders for such shades of paint. As previously mentioned, this avoids the stocking of many pre-mixed paints of different shades of colors, and also avoids the undesirable delay attendant upon the ordering of special shades of paint when the stock is exhausted. As will become apparent, the present apparatus 10 permits the user to set the apparatus for the measurement of the particular colors necessary to produce the color shade he desires. Thereafter it is merely a matter of thoroughly mixing the paints having different color components which have been dispensed by the apparatus. It should be noted, however, that a certain amount of blending or mixing occurs in the normal operation of apparatus 10.

Apparatus 10 comprises a plurality of compartments 12, 14, and 16 which are part of a reservoir 18 formed by the walls of a frame 20. More particularly, frame 20 includes rigid side walls 22 and 24 connected to a rigid back wall 26 and a rigid front wall 28, FIGURE 3. These front, back and side walls are vertically disposed and extend longitudinally or upwardly to form an elongated rectangular enclosure. Frame 20 is pivotally mounted to a support stand 30 to enable frame 20 to be pivoted about an axis 32 for filling of compartments 12, 14, and 16, the external supply conduits being first disconnected.

Frame 20 also includes a top wall 34, a bottom wall 36, and a pair of intermediate walls 38 and 40, and an upper, central wall 42. Reservoir 18 is formed by the front, back, and side walls, and by intermediate wall 40, and a plurality of pairs of flexible wall means, such as a distendable diaphragm 44, divide the interior of reservoir 18 into the liquid storage compartments 12, 14, and 16.

Each of liquid storage compartments 12, 14, and 16 is provided with a filling plug 48 threaded into a suitable opening in bottom wall 36. As will be seen, compartments 12, 14, and 16 are filled by first disconnecting external conduits supplying water, and thereafter pivoting frame 20 about axis 32 until plugs 48 are in an upper position. Thereafter, plugs 48 are removed, the compartments are filled to the desired level. The plugs are then replaced and frame 20 is rotated to its normal position.

Although only three liquid storage compartments are illustrated, a greater number may be employed if desired to provide a wider selection of base colors.

Upper interior wall 42 serves to define a water reservoir 50 which is connected by a conduit 52 to the usual water main.

Wall 42 is provided with an outlet valve 54 operated by a float lever 56 which is pivotally mounted at its left end to wall 42. The right end of lever 56 is extended upwardly, and a float 58 is attached thereto. The water reservoir in which float 58 is operable is provided with a capped vent opening 60 in upper wall 34, the cap therefor being effective to vent in one position, and rotatable to seal opening 60 in another position, as is well known.

Water under pressure enters through conduit 52, passing into reservoir 50, and water from reservoir 50 flows through valve 54 until the level of water in the float reservoir is at the level 62, at which point float 58 closes valve 54. Thus, float 58 is effective to maintain a predetermined level of water 62.

This constant water level or pressure head causes water to flow through intermediate wall 38, through a drain conduit 64 into a pair of branch conduits 66. Each of these branch conduits passes through a suitable opening in intermediate wall 40 and into the chambers provide between the flexible walls 44 of a pair of the flexible wall means.

The flexible and stretchable nature of walls or diaphragms 44 is provided by making the material of walls 44 of plastic or polyethylene material. The stretchable characteristic of walls or diaphragm 44 makes the compartments 12, 14, and 16 akin to a plurality of collapsible bags. That is, the material of each diaphragm or wall 44 is made sufficiently stretchable or extendable that it will be displaced when a compartment on one side of it is filled with liquid while the other side is empty or partly filled. The wall sections 44 dividing the compartments are so flexible and loosely carried that they conform to the pressure of the liquid materials on either side, and the result is that the interior of apparatus 10 defined by the exterior walls thereof is substantially completely filled with liquids. The pressure exerted by the liquids against the bottoms of the various compartments is substantially the same. This is an important feature of the present invention.

Each flexible diaphragm 44 of each pair of diaphragms 44 is adapted to be filled with water from conduit 52 so that the pressure head established by float 58 acts against the interior of these spaces between diaphragms 44 to fill an adjacent liquid storage compartment as the contents thereof are consumed. Diaphragms 44 are connected to walls 36, 40, and 26 and 28 in any suitable fashion so that the pressure compartments formed by each pair of diaphragms 44 is in fluid isolation from the adjacent fluid storage compartments 12, 14, and 16.

From the above description it will be seen that the liquid in each of the liquid storage compartments 12, 14, and 16 imposes a pressure at its outlet similar to the pressures at the other compartment outlets by reason of the action of the diaphragms 44. These diaphragms in effect tend to equalize the liquid pressure at each of the outlets by reason of their conformation to the pressures within the various compartments. Thus, regardless of the amount of liquid remaining in the compartments the pressures at each of their outlets will be substantially the same.

The space between intermediate walls 38 and 40 is reached through an access opening which is normally closed by a door 68 which is pivotally mounted at its upper edge to rear wall 26. It is through this opening that conduits 64, 66 and caps 46 can be reached. That is, caps 46 in particular must be closed before frame 20 is pivoted to fill compartments 12, 14, and 16 through the openings for plugs 48.

The means for regulating the quantity of liquid flowing from compartments 12, 14, and 16 are generally designated 70. Means 70 preferably comprises, FIGURES 3, 4, and 5, a circular plate 72 which is rigidly secured to the inner surface of front wall 28. Plate 72 is provided with an arcuate groove 74 through its inner face, and an opening 76 extending from groove 74 through the plate 72 into fluid communication with a drain conduit 78.

A second circular plate 80 is provided for slidable circular or rotational movement upon the inwardly directed face of plate 72. Plate 80 is provided with a plurality of substantially uniformly spaced, and concentrically disposed openings 82 which are positioned for movement in register or coincidentally with groove 74 by reason of the rigid mounting of plate 80 to shaft 84.

Shaft 84, which is rotatably disposed through a central opening in plate 72, extends through a suitable opening in front wall 28, and through a display wall 86, whose function will shortly be described. A stop washer 88 is pinned to shaft 84, and a compression spring 90 is arranged upon shaft 84 with one end acting against washer 88, and the other end acting against the outer face of wall 28. Thus, spring 90 serves to urge plate 80 into close and fluid-type slidable relationship with plate 72.

The outer end of shaft 84 rigidly carries a knob 92 and a pointer 94, and rotation of knob 92 serves to cumulatively interpose more and more of openings 82 in the path of liquid acting against plate 80 and flowing through groove 74 and opening 76.

The front face of display wall 86, FIGURE 1, carries indicia 96 to apprise the operator of the relative rotated position of plate 80 with respect to plate 72.

Display wall 86 serves to define a space between it and front wall 28 for housing other components therebetween, and is conveniently secured to front wall 28 by a plurality of corner brackets 98.

Each of the compartments 12, 14, and 16 is provided with a similar regulating means 70 so that if pointer 94 of each compartment is arranged on a comparable mark of indicia 96 the quantity of fluid flowing through each drain conduit 78 will be substantially the same. As above discussed it will be the same regardless of the relative amount of liquid content in any of the liquid storage compartments as compared with the remainder of the compartments because of the pressure equalizing effect of the water introduced between the diaphragms 44 of each of the pairs of diaphragms 44. In a similar fashion, each pointer 94 may be set at a different position from the pointers of the other compartments whereby a lesser or greater flow will be caused to pass out of opening 76, and the proportion which this lesser or greater flow bears to the flow of the other compartments will remain the same until the liquids in the liquid storage compartments are substantially exhausted.

A transversely slidable valve 100, FIGURES 5, 6, and 7, is operative to simultaneously open or close the drain passages from the liquid storage compartments. Valve 100 is slidable within an enclosure formed by a pair of channel-shaped brackets 102 which are secured together at their flange positions by suitable machine screws 104. A pair of brackets 106 are secured between the front of wall 28 and the inner one of channel-shaped brackets 102 to secure valve 100 in spaced relation from wall 28.

Valve 100 is solid, and is provided with three transversely disposed openings 108 spaced apart so as to be simultaneously alignable, respectively, with conduits 78. Valve 100 carries a stub shaft 110 at its left end, shaft 110 being slidably carried by a suitable support element 112 which is rigidly secured to front wall 28. Valve 100 is biased to the right by a compression spring 114 which is disposed about shaft 110, and which has its ends in engagement with element 112 and the left end of valve 100. With this arrangement, valve 100 is normally urged or biased to the right so that openings 108 are out of alignment with conduits 78.

A solenoid 116 is mounted to front wall 28, and is energizable to move its core 118 downwardly to thereby pivot a bell crank 120 about a pivot pin 122 which is secured to front wall 28. This pivotal movement of crank 120 will move a stub shaft 124, carried by valve 100, inwardly to bring openings 108 into alignment with conduit 78 to thereby permit drainage of compartments 12, 14, and 16, through discharge lines 126.

FIGURE 8 diagramatically illustrates the particular means by which solenoid 116 is energized, although it will be apparent that other means for energizing solenoid 116 may be employed if desired. The particular means for energizing solenoid 116 comprising, generally, an off-on switch 128 which is connected to a source of power 130. Switch 128 is closed to energize a mechanical switch 130 and also the motor of a timer 134. Timer 134 is of usual and conventional construction, and may be set to operate for a certain period of time before an internal clutch mechanism thereof operates to interrupt the current flow to solenoid 116.

Assuming that timer 134 has been set to operate for ten seconds, for example, closure of switch 128 starts the operation of the motor of timer 134, and solenoid 116, by reason of its electrical connection to timer 134, is energized. This moves sliding valve 100 to the left. When ten seconds have elapsed, timer 134 is operative to interrupt the circuit to magnetic switch 134, and this opens switch 132, thereby cutting off power to solenoid 116. In order to start the cycle again, switch 128 must again be depressed.

In operation, knobs 92 are set at those indicia marks 96 which are operative to dispense the desired amounts of colored paint or pigments from compartments 12, 14, and 16. Next, switch 128 is closed to operate solenoid 116, and consequent sliding movement of valve 100 moves openings 108 into register with conduits 78 to dispense the liquids through lines 126.

It is important to note that the present apparatus is effective to maintain a constant pressure, and a pressure which is predetermined. That is, the liquid level 62 is maintained constant by float 58 so that the pressures exerted upon the contents of compartments 12, 14, and 16 are substantially constant so that the liquid dispensed out of drain lines 126 are forced out at a substantially constant pressure at a predetermined level of pressure. This is in contrast to the apparatus of applicant's copending application Serial No. 770,146, above referenced, which is effective to maintain a constant pressure, but the level of pressure diminishes as the liquids in the apparatus are dispensed.

By maintaining the discharge pressure at a constant level, as in the present apparatus, it will be apparent that timer 134 can be set to, for example, ten seconds, and the amount of liquid or paint dispensed during that period will be substantially the same as the amount dispensed whenever the timer is set for ten seconds. Likewise, the apparatus will dispense half that amount when the timer is set for five seconds. Thus, the apparatus is uniquely adapted to utilize a timer, with accurate repeatability of amounts dispensed, because of the constant and predetermined magnitude of pressure at the discharge conduits 78. Further, the use of a timer such as timer 134 vastly increases the number of shades of color which can be created, where compartments 12, 14, and 16 contain color pigments.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. Apparatus for dispensing measured quantities of different liquids, said apparatus comprising: means forming a reservoir; means forming a distendable chamber within said reservoir to divide the interior of said reservoir into two separate liquid storage compartments each adapted to contain a different liquid which is to be dispensed, said compartments each having an outlet, said chamber having an inlet; means for introducing liquid under constant pressure through said inlet; and means for individually regulating the quantity of liquid flowing through each said outlet.

2. Apparatus according to claim 1 and characterized in that said last-mentioned means includes means for each outlet defining a series of orifices cumulatively interposable in the path of liquid flowing from said outlet to thereby regulate the quantity of liquid flowing from said outlet.

3. Apparatus according to claim 1 and characterized in that said last-mentioned means includes a slidable valve having a plurality of openings simultaneously registrable with said outlets, and means for moving said slidable valve to position said openings in and out of register with said outlets.

4. Apparatus according to claim 1 and characterized in that said means for introducing liquid under pressure through said inlet includes a pressure reservoir in fluid communication with said inlet, and means for maintaining liquid in said pressure reservoir at a predetermined level.

5. Apparatus according to claim 1 and characterized to include timer means for adjusting the period of time during which liquid flows out of both said outlets.

References Cited in the file of this patent

UNITED STATES PATENTS

| | | |
|---|---|---|
| 1,707,058 | Kauwertz | Mar. 26, 1929 |
| 2,515,570 | Rubinfield | July 18, 1950 |
| 2,529,937 | Hale | Nov. 14, 1950 |
| 2,698,114 | Buhr | Dec. 28, 1954 |
| 2,758,747 | Stevens | Aug. 14, 1956 |
| 2,847,145 | Brasile et al. | Aug. 12, 1958 |
| 3,057,517 | Douglas | Oct. 9, 1962 |